C. F. BRUSH.
Automatic Cut-Out Apparatus for Electric Lights or Motors.
No. 234,456. Patented Nov. 16, 1880.
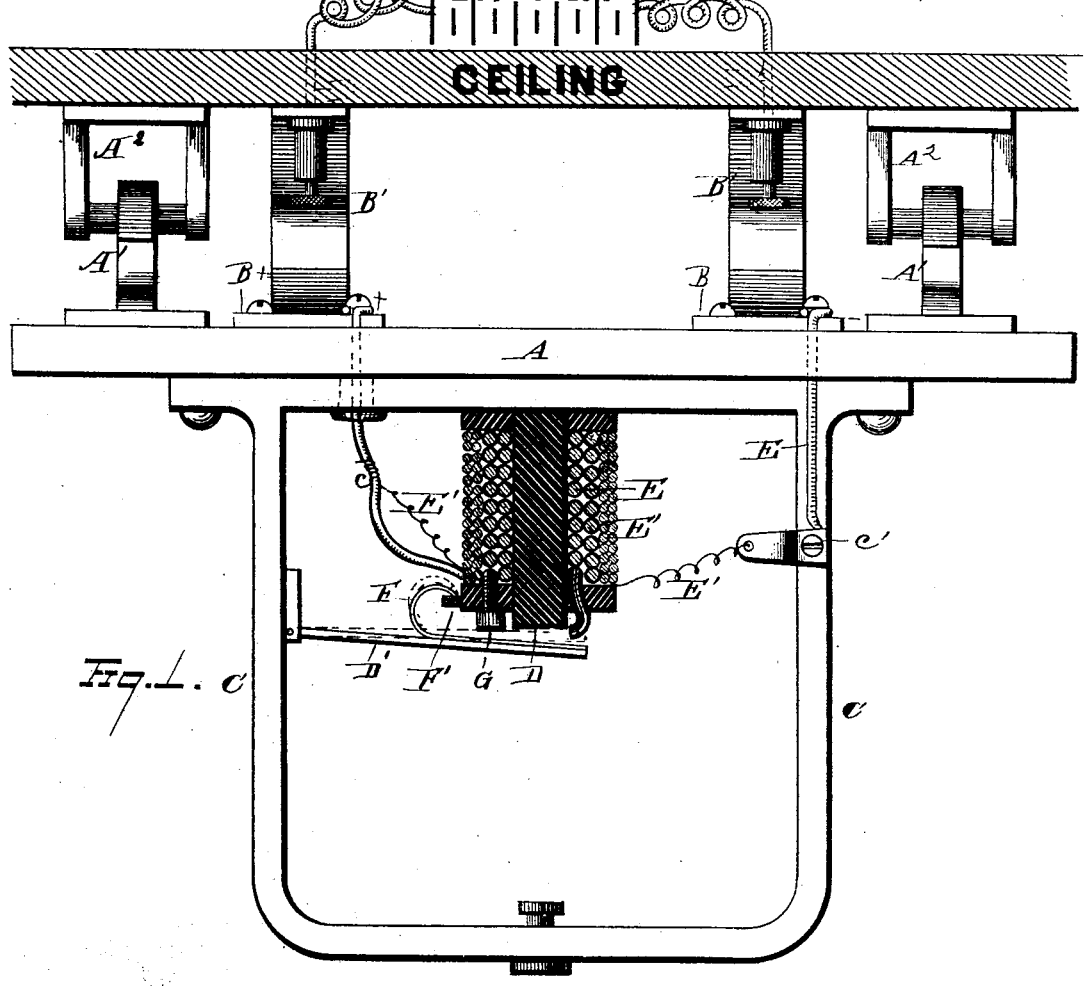
Fig. 1.
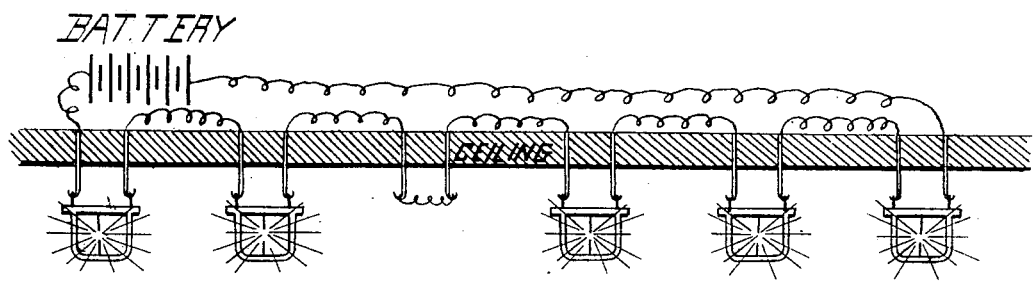
WITNESSES
E. J. Nottingham
A. W. Bright
INVENTOR
Chas. F. Brush.
By Leggett and Leggett
ATTORNEYS

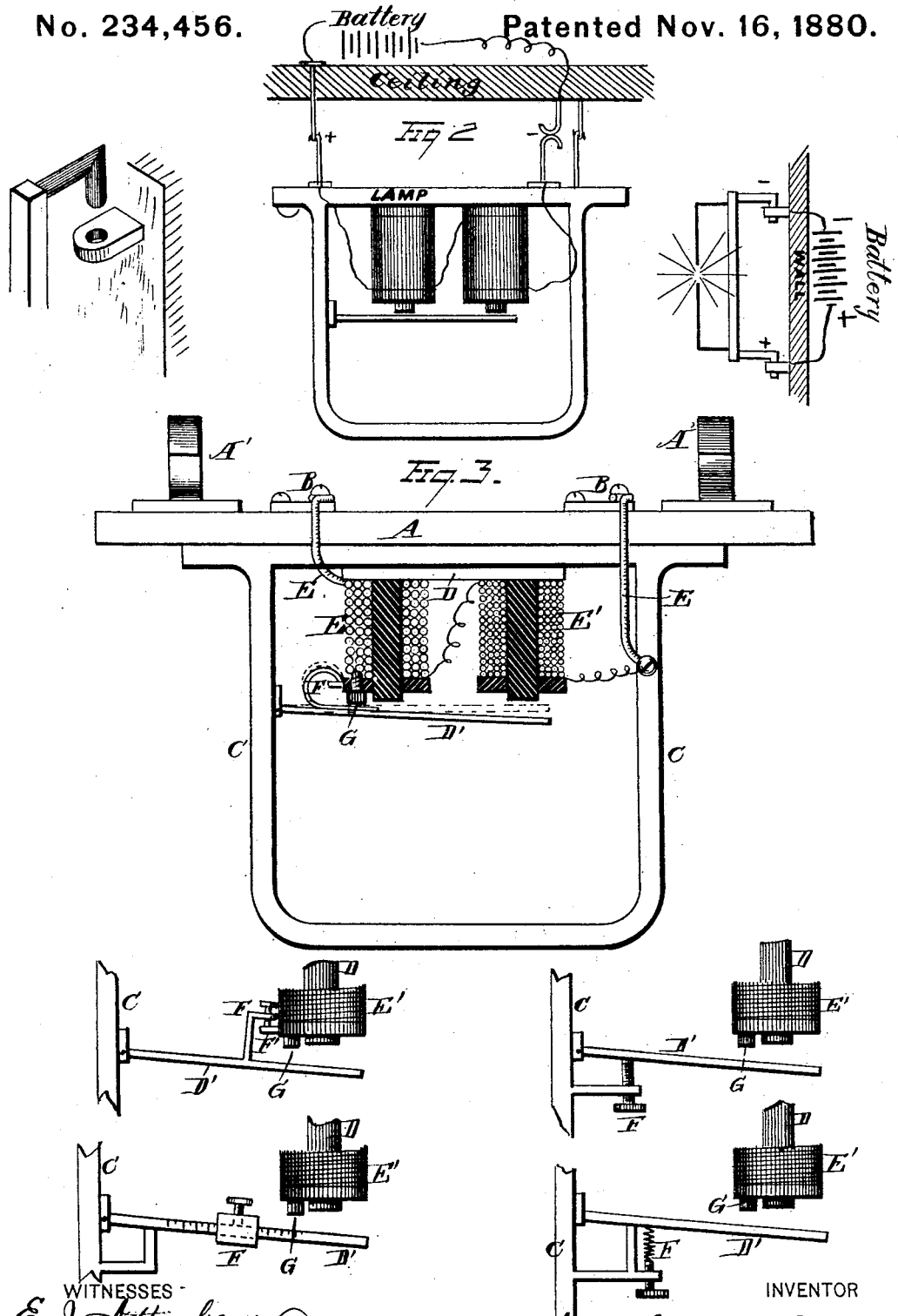

C. F. BRUSH.
Automatic Cut-Out Appparatus for Electric Lights or Motors.
No. 234,456. Patented Nov. 16, 1880.
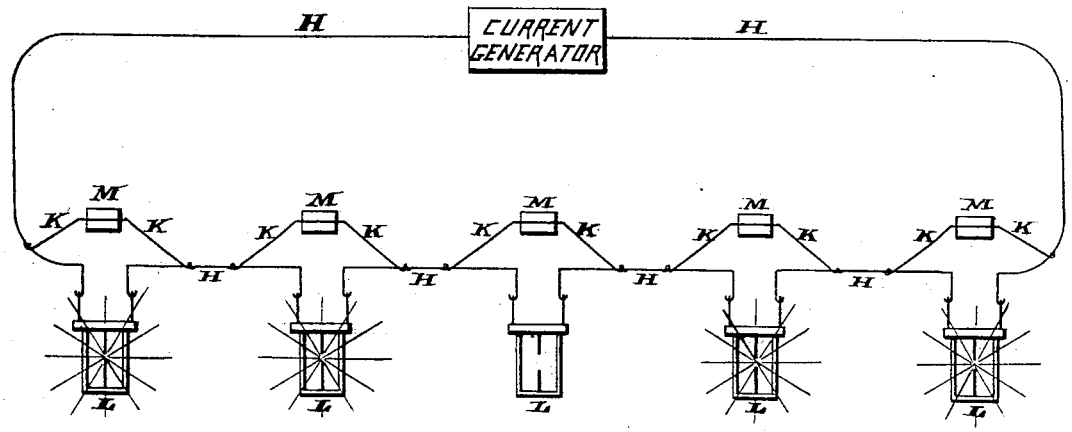
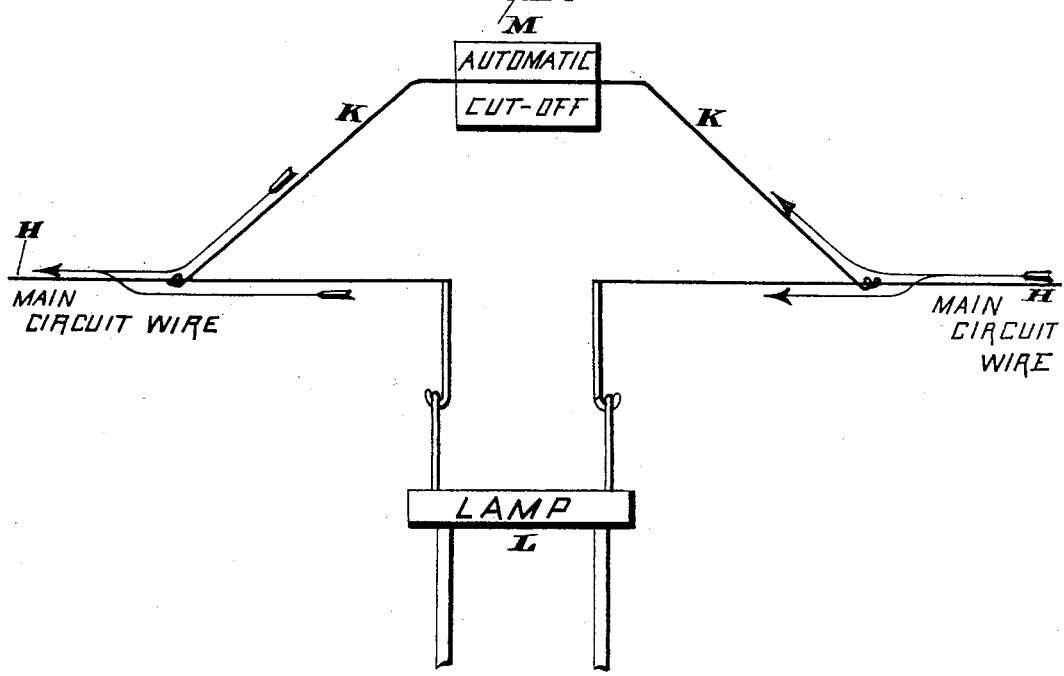

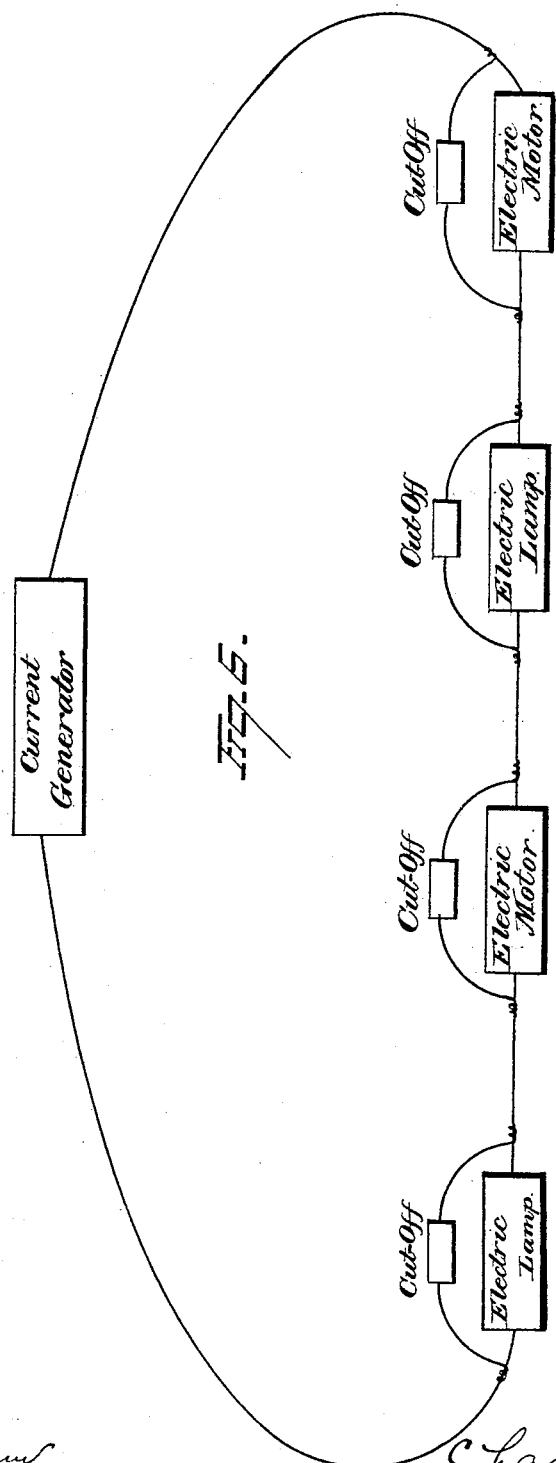

UNITED STATES PATENT OFFICE.

CHARLES F. BRUSH, OF CLEVELAND, OHIO.

AUTOMATIC CUT-OUT APPARATUS FOR ELECTRIC LIGHTS OR MOTORS.

SPECIFICATION forming part of Letters Patent No. 234,456, dated November 16, 1880.

Application filed September 30, 1878.

*To all whom it may concern:*

Be it known that I, CHARLES F. BRUSH, of Cleveland, in the county of Cuyahoga and State of Ohio, have invented a certain new and useful Method and Means of Employing Electricity for Lighting and other Purposes; and I do hereby declare the following to be a full, clear, and exact description of the invention, such as will enable others skilled in the art to which it pertains to make and use it, reference being had to the accompanying drawings, which form a part of this specification.

My invention relates to the employment of electricity for lighting and other purposes, and especially to a system where more than one electric lamp, electro-motor, or any other electro-receptive device—that is, a device to be operated upon or actuated by an electric current—are located within a common or continuous circuit; and said invention consists in a system wherein two or more electric lamps, electro-motors, or other electro-receptive devices are placed within a single or common circuit, each of said electro-receptive devices associated with a closed shunt-circuit, within which is included a cut-off or short-circuiting contrivance, the whole being constructed, arranged, connected, and adjusted in such a manner that if any of the said electro-receptive devices should offer too great an electrical resistance the current in its individual shunt will be so affected that its cut-off shall be called into operation to automatically short-circuit that particular electro-receptive device, cutting it out of circuit without interrupting or breaking the current in the general circuit or in the remaining electro-receptive devices.

My invention also consists in the combination, with a single electric lamp, motor, or other electro-receptive device, of a closed shunt-circuit, within which is included a cut-off or short-circuiting contrivance, the whole being so constructed, arranged, connected, and adjusted that the electric current shall, during the operation of said electro-receptive device, divide itself between it and its said shunt, and so that if, from any cause, said receptive device shall offer a too great electrical resistance, said resistance shall so affect the current in said shunt that said cut-off shall be called into operation to automatically short-circuit said electro-receptive device.

My invention also consists in a system for the employment of electricity for lighting and for other purposes, said system consisting of a suitable electric-current generator, and connected therewith a general-circuit conductor, said conductor being divided at each point where the current is to be utilized into more than one closed path or circuit, one containing a machine or device to be operated upon or actuated by the electric current and another containing a cut-off or short-circuiting contrivance for automatically cutting said machine or device out of the circuit whenever, from any cause, said machine or device shall offer too great an electrical resistance.

My invention also consists in a peculiar construction and arrangement of the electrical-contact surfaces between the general-circuit conductor and an electric lamp, electro-motor, or other electro-receptive device that is designed to be hung or attached to a wall, ceiling, or support, whereby said lamp, motor, or electro-receptive device is placed in circuit by the simple act of fixing it in the locality where it is desired to be used.

I shall describe my invention as applied to electric lamps, and to a system where more than one lamp are placed within the same circuit and each provided or associated with its individual short-circuiting apparatus.

When several electric-light regulators are operated by a single electric current it is evident that the failure of any one of the regulators to feed its carbons forward will, by ultimately interrupting the current, not only extinguish itself, but also the lights of all the other regulators. It is to guard against this accident that I have designed my present invention.

My device operates to close the electric circuit through the regulator by affording a passage for the current independent of the carbon points when the latter fail to move forward properly. This short-circuiting may be made to occur either before or after the interruption of the current by the too great separation of the carbons.

I accomplish my design by shunting from the main current that passes through the regulator a small portion of said main current by means of a helix of suitably high resistance. The ends of this helix are connected to the main circuit of the regulator at points on opposite sides of the voltaic arc. Hence, as is well known, the amount of current through this helix must vary with the resistance of said voltaic arc. If, now, the regulator to which this helix is applied fails to advance its carbons, their increasing separation due to their combustion or other cause will constantly increase the resistance of the voltaic arc, and thus shunt more and more of the whole current through the helix, whose resistance remains constant. This action may continue until the voltaic arc finally ceases, in which case the resisting helix, affording the only circuit through the regulator, may convey even more current than before the cessation of the arc.

I inclose within the helix a core of iron and place near the lower end of this core an armature at such a distance that the magnetism of the core induced by the current in the helix shall be insufficient to raise it when the normal amount of current is passing through the helix; but when, owing to the too great separation of the carbons in the regulator or the cessation of the voltaic arc, this current increases beyond a certain strength, the armature is attracted and drawn toward the core, thus making a contact between suitable metallic surfaces suitably connected, and affording a free passage for the current through or around the regulator independent of the carbons. But it will be obvious that when the device has operated as just described, the current will be greatly lessened in the said helix, and consequently, without some retaining device the armature would fall back in its old position, thus opening the electric circuit. Residual magnetism may be utilized for this purpose, and a number of mechanical devices also readily suggest themselves; but I prefer for this purpose the device shown in the drawings. It consists of the second helix of coarse wire surrounding the core, which helix forms part of the short circuit which is established when the core lifts its armature. This helix, coming into action at the instant when the helix of high resistance, before described, ceases to be efficient, maintains the magnetism of the core, and consequently the integrity of the short circuit, until the faulty regulator is removed or the current stopped.

My whole device may be combined with and form part of an electric-light regulator, as shown in the drawings, or it may be constructed as a separate piece of mechanism and applied to any regulator, either near or at a distance, by means of suitable conducting-wires.

Two cores may be employed instead of one, as described, thus forming an ordinary horseshoe electro-magnet, and the two helices described (or more than one of each) may be arranged in many obvious ways in relation to each other while still performing their peculiar functions; or the second helix of coarse wire may be dispensed with, as above indicated.

In the drawings, Figure 1 shows one form of device embodying my invention and one method of placing several lamps on a single circuit, also one method of attaching a pendent lamp to a ceiling. Fig. 2 shows a few of various modifications to which my invention is susceptible as relates to the method of attaching a lamp to a wall or ceiling. Fig. 3 shows a few of various modifications to which my invention is susceptible as regards mechanism for automatically accomplishing the shunting or short-circuiting hereinbefore mentioned.

The form in which I shall describe my invention is that of the pendent or swinging lamp, which, as appears in United States Patent No. 203,411, granted to me May 7, 1878, is but one of several varieties; but I wish it to be understood that I do not limit the application of my present invention to any specific form of lamp or regulator whatever, inasmuch as it may be adaptable without any material variation to electric-light regulators of many kinds other than I have shown.

A is a plate of wood, gutta-percha, or any suitable non-conducting material. To this plate are attached the suspending hooks, loops, or their equivalent, $A'$. These hooks are simply designed to suspend the lamp, and are not placed in electrical connection with any part of the apparatus. $A^2$ are loops or hooks attached to the wall or ceiling, with which the hooks $A'$ engage.

B B are contact-plates, springs, or their equivalents, representing and placed in electrical connection respectively with the positive and negative poles of the lamp.

$B'$ $B'$ are stationary plates, springs, or other suitable equivalent contact-surfaces fixed stationary at that locality in the wall or ceiling where the lamp is intended to be used. These contact-surfaces $B'$ represent and are placed respectively in electrical connection with the battery, dynamo-electric machine, or other source of electric current.

The contact-surfaces B and $B'$ may be constructed in any manner, so that by the act of placing the lamp in position they shall be brought together in such a way that the lamp is put in the electric circuit.

I do not limit myself to any special design or construction of the contact-surfaces B $B'$, as they may be indefinitely varied without in any degree departing from my invention.

C is a frame, preferably constructed of iron or other electro-conducting material, and this frame is formed in any proper manner to hold and accommodate the various parts of the regulator.

D is the magnet-core hereinbefore described. $D'$ is its armature. Around the magnet-core is wound the helix E, of coarse wire, and the helix $E'$, of fine wire.

It will be observed that the armature is made movable by pivoting it to the frame C. The armature and frame C are placed in electrical connection with each other. The position of the armature $D'$ during the time that the lamp is properly acting is in its dropped position away from the core D. The distance of the armature's drop may be regulated in any desired way by means of the curved piece F, which may be bent at pleasure to adjust the desired drop of the armature. The piece F rests upon any suitable stop F'.

G is a contact-point of any suitable conducting material, so placed that the armature as it is lifted will impinge against it before coming into contact with the core D, thus always preventing any actual union between the core and armature. This contact-point G connects with the coarse-wire helix E. The coarse helix is arranged and connected as follows: Commencing from the contact-plate B, it describes a helix around the core D and terminates with the contact-point G. Thus it will be seen that until connection is made between the contact-point G and armature D' the coarse helix E does not constitute a completed circuit. The fine-wire helix E', commencing from its attachment to the coarse wire, as shown at c, proceeds directly to describe a helix about the core D, and then connects with the frame at c', and also with the pole B opposite from that to which the coarse helix E is primarily connected, as above specified.

It is obvious that the device just specified is susceptible of an indefinite number of modifications. For instance, instead of the magnet, as described, a horseshoe or two-legged magnet may be used, one leg carrying the coarse-wire and the other the fine-wire helix, and the connections be made substantially as before shown. Likewise the armature and its adjustment may be indefinitely varied, as indicated in the drawings.

During the time that the lamp is properly performing, the current through the fine-wire helix E' will not be sufficient to lift the armature D'; but when it is desirable to "short-circuit" the lamp, as above set forth, then the current will be sufficiently strong to draw this armature. The degree of strength of current required to lift the armature is determined entirely by the adjustment of the armature, and this degree may be greater or less as circumstances may require.

It will be borne in mind that during the time the armature is in its dropped position the main portion of the current is passing through the carbons; but when the armature is drawn into its contact position, then the carbons are cut out of the electric circuit, and the current takes the following course: Beginning from the pole B, it passes down through coarse helix E, thus strongly magnetizing the core D and thus securely maintaining the contact position of the armature, then through the contact-points G and through the armature D' to the frame C, and from thence to the opposite pole B', with which the frame C is now in electrical connection.

Instead of constructing the magnet and armature as shown in the drawings, these parts may be adapted to operate by the force of axial magnetism. In such case the helix or helices E or E' are wound upon a hollow spool, within which extends a core attached to a lever similar to the armature D'. The attractive effect of the current in such a construction would be to draw the core up within the hollow of the helix-spool, thus to make a contact between part G and frame C, as already specified.

As already mentioned, the shunting or cut-off mechanism, being an independent structure, need not of necessity be coupled with a lamp in a single device. Its character and functions would in no manner or degree be changed were the lamp proper to constitute one separate structure and the cut-off mechanism another so long as the two are so arranged and electrically connected with the main-circuit conductor that the current shall divide itself between said lamp and cut-off, as already hereinbefore shown.

Fig. 4 of the drawings illustrates, in a diagrammatic manner, a system wherein the lamps and their individual short-circuiting devices are separate structures and located apart from each other. Fig. 5 is an enlarged view of a single lamp and its cut-off arranged as shown in Fig. 4. We here see five lamps, L, included within a single circuit, H. At each lamp the main-circuit conductor H is split, so that the current not only passes through the lamp L to operate it, but also through the conductor K and the shunting or short-circuiting device M. Thus arranged and connected the lamps and their individual shunting devices may be located in different places, if it should be desired, and it is plainly evident that when thus arranged all the parts will operate in identically the manner and to the effect already specified.

I have now disclosed in detail one manner of embodying and applying my invention, from which it will clearly appear that it is equally applicable, without material change or modification, to other electro-receptive devices than lamps; and Fig. 6 of the drawings illustrates diagrammatically a system wherein two electric lamps and two electro-motors are placed upon a single circuit, and in association with each is shown its individual short-circuiting device, which, as already shown, may be a separate structure or not, as desired. In such a system as indicated and suggested in Fig. 6, if a lamp or a motor from any cause should offer a too great electrical resistance, it will cause an increased amount of current to be sent to the short-circuiting apparatus connected therewith, and the faulty lamp or motor will be automatically cut out of circuit, and this without a breaking of the general circuit or any material disturbance of the current therein, so that all the remaining lamps or motors on said circuit are practically unaffected.

What I claim is—

1. An electric-lighting apparatus constructed to offer two conducting-paths to the electric current at the same time, one path including the illuminating-electrodes and the other path including a shunting or short-circuiting device, substantially as and for the purpose shown.

2. An electric-lighting apparatus combining the following instrumentalities, to wit: illuminating-electrodes and an automatic shunting or short-circuiting device for extinguishing the light of said electrodes, said shunting or short-circuiting device constructed to be called into its light-extinguishing function through the agency of an increased proportion of the electric current diverted to it by reason of any undue electrical resistance offered by the said illuminating-electrodes or the mechanism operating them.

3. A system wherein two or more electric lamps are included within a single circuit, with a short-circuiting device associated with each lamp, the said circuit-conductor so arranged and constructed that the current shall divide itself at each lamp between said lamp's electrodes (and the mechanism operating them) and that lamp's individual shunt or short-circuiting device, the whole so constructed, connected, and adapted to operate that if from any cause any lamp shall offer an abnormally great electrical resistance an increased proportion of the current will be diverted to that lamp's particular short-circuiting device, which increased proportion of current through said short-circuiting device shall automatically call it into operation to extinguish the light of said faulty lamp, and at the same time to transmit the current so as not to extinguish or materially affect any other lamp upon the circuit, substantially as shown.

4. An electro-magnet, D, having a fine-wire helix, E', and a coarse-wire helix, E, combined and electrically connected substantially as shown, and constructed to shunt the current from an electric lamp with which it is associated when said lamp shall offer an abnormally great electrical resistance, substantially as and for the purpose shown.

5. The combination, with an electric-lighting apparatus, of the helix E', of comparatively high resistance, said helix E' constructed to automatically operate a shunting or short-circuiting device that shall extinguish the light whenever said apparatus shall offer an abnormally great electrical resistance, substantially as and for the purpose shown.

6. An automatic cut-off or short-circuiting apparatus adjusted and electrically connected with an electric lamp, electro-motor, or other electro-receptive device, substantially as indicated, so that the electric current from the main circuit-conductor will be divided between said cut-off and electro-receptive device, the cut-off being constructed to automatically short-circuit and cut out said electro-receptive device through the influence of an increased amount of current diverted to said cut-off by reason of a too great electrical resistance offered by said electro-receptive device.

7. The combination, with any suitable electric-current generator and an electric-circuit conductor connected therewith, of shunt-circuits connected with the conductor on opposite sides of any point or points therein from which the current or a portion thereof is to be utilized for any purpose, and a device located in said shunt-circuit and adapted to interpose any desired resistance in the shunt-circuit and to automatically put in circuit a supplemental electric conductor whenever the main conductor or machine connected therewith offers a too great electrical resistance.

8. A system for the employment of electricity for lighting and for other purposes, said system consisting of a suitable electric-current generator and connected therewith a general circuit-conductor, said conductor being divided at each point where the current is to be utilized into more than one closed path or circuit, one path or circuit containing a machine or device to be operated upon or actuated by the electric current and another path containing a cut-off or short-circuiting contrivance for automatically cutting said machine or device out of the circuit whenever from any cause said machine or device shall offer too great an electrical resistance.

9. An electro-receptive device, in combination with a constantly-closed shunt electrically connected with the main-circuit conductor upon both sides of said electro-receptive device, said shunt constructed or provided with suitable contrivance for automatically putting in circuit and around said electro-receptive device a supplemental conductor for receiving and transmitting the main-circuit current whenever from any cause said electro-receptive device shall offer too great an electrical resistance.

10. In combination with a suitable device for attaching an electric lamp to a wall, ceiling, or support, one or more suitable contact-surfaces, B B, electrically connected with said lamp, and contact-surfaces B' B', representing and placed in electric connection respectively with the positive and negative poles of the battery or other source of electric current, said contact-surfaces B' placed stationary at the locality where said lamp is intended to be used.

In testimony whereof I have signed my name to this specification in the presence of two subscribing witnesses.

CHARLES F. BRUSH.

Witnesses:
LEVERETT L. LEGGETT,
JNO. CROWELL, Jr.